United States Patent Office 3,766,116
Patented Oct. 16, 1973

3,766,116
PRINTING INK COMPOSITIONS CONTAINING AN ALKANOLAMINE SALT OF AN ALIPHATIC ALPHA-OLEFIN/ACRYLIC ACID COPOLYMER
Gary V. Olhoft, Charleston, W. Va., assignor to Union Carbide Corporation, New York, N.Y.
No Drawing. Continuation-in-part of application Ser. No. 763,926, Sept. 30, 1968. This application Apr. 13, 1971, Ser. No. 133,741
Int. Cl. C08d 11/02; C08f 45/24
U.S. Cl. 260—29.6 HN          23 Claims

ABSTRACT OF THE DISCLOSURE

Inks having low foaming tendencies, good pigment dispersing properties, stable viscosities can be formulated from a mixture of pigment and a carboxyl-containing aliphatic $\alpha$-olefin polymer salt containing at least 80 mole percent of an $\alpha$-olefin having up to 10 carbon atoms and 4 to 20 mole percent of an $\alpha,\beta$-ethylenically unsaturated carboxylic acid copolymerized therein, dispersed in water and/or alkylene glycols. This polymer salt has about 30 to 100 percent of its carboxylic acid groups neutralized with an alkanolamine.

BACKGROUND OF THE INVENTION

This is a continuation-in-part of Ser. No. 763,926 filed Sept. 30, 1968 now abandoned.

This invention relates to printing ink compositions and more particularly, to those used in flexographic, gravure and newspaper relief printing processes.

The inks used in the flexographic and gravure printing processes are low viscosity and rapid drying. These inks consist essentially of hard resins and colorants or pigments dispersed in volatile solvents. In the flexographic process the inks are transferred from raised type on flexible rubber plates to the particular substrate under low pressure making the process well suited for printing the extensible films often used in packaging. Although flexographic inks initially employed an alcohol, especially ethanol or propanol as the solvent, there is a growing preference for aqueous inks motivated by advances in aqueous resins systems. These inks are used predominantly on paper substrates where absorption can aid drying such as milk cartons, tissues, toweling, corrugated cartons and the like. In the gravure process the inks are transferred from the engraved portion of a metal cylinder to the substrate. Because of the durability and high cost of the printing plate this process is best suited for long printing runs. Present aqueous gravure inks give low quality prints and are used primarily on substrates such as wallpaper and multi-wall bags where high print quality is unnecessary. There is a continuing need in the industry to improve the quality of inks with regard to economy, safety, and reduced pollution.

The resins most widely used for prior art aqueous, flexographic ink compositions are proteins, shellac, rosin derivatives and acrylics. Aqueous gravure inks are generally protein based. Since proteins, shellac and rosin esters are not water soluble, they must be dispersed in water with a base. Ammonia has been preferred since it volatilizes from the ink films but it has a strong odor and often evaporates on the press precipitating the ink thereon. Other less volatile alkalies have been used such as borax, urea and morpholine, but these have a tendency to impart water sensitivity to the ink films.

Although shellac can be dissolved in an alkaline water-ethanol mixture, it must be both dewaxed and bleached before incorporation into an ink formulation. Films obtained from a shellac ink system tend to be brittle, have little rub resistance and low gloss. Furthermore, shellac has poor solvent release properties and its low melting point can cause smearing in heat-sealing equipment.

Proteins such as casein, zein, and soya protein are used as binders for aqueous inks. Casein, which is normally used in aqueous alkali solutions, imparts a high viscosity to the ink formulation at low total solids and requires modification with shellac or a rosin ester in most instances. Zein gives lower viscosity solutions, but it also requires modification. Although the films of protein-ink formulations are heat resistant, non-thermoplastic, hard and tough, they are sensitive to water and have low gloss. To improve gloss, flexibility and water resistance, the addition of shellac or rosin esters to the protein formulation is normally required. Proteins require preservatives to protect the ink formulation against bacterial attack. Casein and zein suffer the further disadvantage of fluctuating widely both as to price and availability.

The rosin esters used in aqueous ink formulation are usually partially esterified maleic rosin esters and are not good film formers but because of their low cost they are used in conjunction with more expensive resins to increase total solids and aid pigment dispersion.

Although acrylic ink formulations exhibit enhanced properties over shellac, protein and rosin derivative based formulations, they require an alcohol-water system and become thixotropic at high pH's. Acrylic systems wet and disperse pigments poorly and produce low gloss films. They are also quite expensive.

The amount of pigmentation required in aqueous inks is one of the principle factors limiting their use. Aqueous inks are often used on substrates of poor quality which necessitates the use of highly opaque ink films to hide and decorate the imperfections. Therefore, aqueous inks are usually more highly pigmented than solvent based inks which are used where the substrate is of a higher quality and often decorative in itself, as for example, aluminum foil. Unfortunately most aqueous vehicles are poor pigment dispersants often developing a highly thixotropic rheology when pigmented and causing pigment flocculation. Overcoming these limitations in currently available aqueous inks usually calls for costly additives.

Other shortcomings of the available water-based inks are the lack of gloss, low scuff and mar resistance as well as foaming tendencies of the inks.

In applications requiring extra high ink film durability and/or gloss, overprint lacquers are sometimes used. In flexographic and gravure printing such over print lacquers are solutions of hard resins in volatile solvents modified with waxes or other materials to provide abrasion resistant, nonblocking films. The resins used must release solvents readily to provide rapid drying. The resins must have low color and be non-yellowing in order to prevent discoloration of the printing. As in the case of aqueous inks, aqueous overprint lacquers possess economic, safety, and reduced pollution advantages over non-aqueous systems.

The inks ordinarily used for printing newspapers via the letterpress printing processes are dispersions of pigment in mineral oil with several percent resin to disperse the pigment. These inks contain no volatile diluent and dry completely by absorption allowing the ink to smear if rubbed and sometimes resulting in strike-through (ink penetration to reverse side of paper), or show-through (paper becomes transparent). New inks currently used tend to mist (ink films from filaments when transferred between rapidly rotating cylinders and when a filament splits in two places and a portion of the filament is flung into the air causing misting), resulting in serious air contamination and cleaning problems. Experimental work in the industry has shown that aqueous systems do not have these draw backs; but up to this time no aqueous system has been found which is economical, has sufficient pigment and dispersion properties, and will not cause pick-off of paper fibers onto the conventional printing plates.

SUMMARY OF THE INVENTION

It has been now discovered that inks having low foaming tendencies, good pigment dispersing properties, and stable viscosities which are not susceptible to bacterial attack and which afford ink films having good abrasion resistance, adhesion, and high gloss can be formulated from a mixture comprising:

(1) about 5 to 30 percent by weight of a salt of an aliphatic α-olefin/α,β-ethylenically unsaturated acid copolymer containing at least 80 mole percent of an aliphatic α-olefin having up to 10 carbon atoms and 4 to 20 mole percent of an α,β-ethylenically unsaturated acid copolymerized therein, said copolymer being about 30 to 100 percent neutralized with an alkanolamine having the formula $(R)_y N(R'OH)_x$ where $x = 3 - y$, R is H or an alkyl having 1 to 10 carbon atoms and R' is an alkylene radical having 2 to 10 carbon atoms;

(2) About 5 to 50 percent by weight of pigment; and (3) 20 to 90 percent by weight of at least one diluent selected from the class consisting of water and an alkylene glycol having the formula

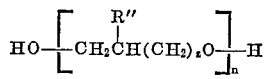

wherein R" is a monovalent radical selected from the group consisting of H or lower alkyl, z is an integer having values of 0 to about 3 and n is an integer having values of 1 to about 4.

As an extension of this invention aqueous dispersions of the α-olefin polymer salts described supra, without pigment can be used as an overprint varnish for printed articles in a proportion of about 5 to 30 percent by weight of salt and about 95 to 70 percent by weight of water.

DESCRIPTION OF THE INVENTION

Ink formulations of this invention containing only water as the diluent can be used in flexographic, gravure and newspaper relief printing processes. Those inks described herein containing a mixture of water and an alkylene glycol as the diluent are preferably used in flexographic or gravure printing processes where the presence of the alkylene glycol provides a means of controlling the drying rate. Where an alkylene glycol is used as the diluent without water, the inks of this invention are preferably used as letterpress inks in newspaper relief printing processes since the glycol diluents yield the necessary pseudoplastic rheology and a non-drying character.

Exemplary alkylene glycols useful in the practice of this invention include ethylene glycol, diethylene glycol, triethylene glycol, tetraethylene glycol, 1,2-propylene glycol, 1,3-propylene glycol, dipropylene glycol, 1,2-butane glycol, 1,3-butane glycol, 1,4-butane glycol, 1,4-pentane glycol, 1,5-pentane glycol, and the like.

The aliphatic α-olefins employed as comonomers in the polymers of this invention have the general formula:

where R''' is either, a hydrogen or an alkyl radical having up to 8 carbon atoms. Thus, suitable α-olefins include: ethylene, propylene, butene-1, pentene-1, hexene-1, neohexene, octene-1, nonene-1, decene-1, 3-methylbutene-1, 4-methylpentene-1, 3-methylhexene-1, 4,4-dimethylhexene-1, and the like. Although polymers of high olefins can be used, they are not as commercially available or economical as the lower olefins.

The α,β-ethylenically unsaturated carboxylic acids used in the polymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half-esters of the above dicarboxylic acids such as methyl hydrogen maleate, methyl hydrogen fumarate, ethyl hydrogen maleate, ethyl hydrogen fumarate, and the like.

Although the copolymer salts of this invention can contain from about 4 to 20 mole percent of an α,β-ethylenically unsaturated carboxylic acid, it is preferred to use about 6 to 14 mole percent of this comonomer and even more preferred to use from about 7.5 to 10.5 mole percent.

Although the degree of neutralization of the α-olefin polymer salts of this invention can range from about 30 to 100 percent, it is preferred to employ a range of from 40 to 80 percent.

The alkanolamines used in this invention include monoalkanolamines, dialkanolamines, trialkanolamines, N-monoalkyl alkanolamines and N,N-dialkyl alkanolamines.

The preferred alkanolamines of this invention are N,N-dialkyl alkanolamines of which N,N-dimethyl ethanolamine is particularly preferred although others can be used such as N,N-diethyl ethanolamine, N,N-dipropyl ethanolamine, N,N-dibutyl ethanolamine, N,N-dipentyl ethanolamine, N,N-dimethyl propanolamine, N,N-diethyl propanolamine, N,N-dipropyl propanolamine, N,N-dibutyl propanolamine, N,N-dipentyl propanolamine, N,N-dihexyl ethanolamine, N,N-diheptyl ethanolamine, N,N-dioctyl ethanolamine, N,N-dinonyl ethanolamine, N,N-didecyl ethanolamine, and the like.

It is to be emphasized that while many salts of carboxyl-containing α-olefin polymers are known, the alkanolamine salts of this invention afford uniquely stable, aqueous, colloidal solutions having low viscosity, high total solids content, low pH and fine particle size. These properties will be appreciated by those skilled in the art to be important in aqueous ink formulations. Colloidal solutions are superior to dispersions with larger particle sizes because they provide better pigment wetting and their pigmented solutions are more stable. Colloidal solutions of the subject polymers are translucent while dispersions with larger particle sizes are milky.

Another advantage in use of the ethanolamine salts of this inevntion is the almost complete absence of scrap formation of the aqueous dispersions prepared after neutralizing the particular α-olefin unsaturated acid copolymer with an ethanolamine. Although the exact nature of this scrap is not known, it is a common phenomenon encountered when one attempts the neutralization of carboxyl-containing α-olefin polymers with various common neutralizing agents. For example, ammonia or metal hydroxides produce scrap in the neutralization process as do various organic basic neutralizing reagents.

Formulations prepared from the aqueous colloidal salt solutions of this invention afford films having outstanding gloss and water resistance and are particularly useful in flexographic and gravure printing. The excellent pigment wetting properties of these aliphatic α-olefin/α,β-ethylenically unsaturated copolymer salt solutions are demonstrated by their compatibility with a wide range of pigments. The resultant inks evince good color development, little pigment settling and stable viscosities. In addition they are tolerant to alcohol and Cellosolve solvents (trademark for a monoalkyl ether of ethylene glycol) allowing formulators to adjust the rate of drying surface wetting properties and rheological properties in general.

The ink formulations of this invention have a wide range of adhesion thus permitting their use on both paper and film substrates. It is particularly noteworthy that the dried ink films of this invention develop water resistance with little or no heating.

Some of the advantages of the ink formulations derived from ethanolamine salts over ammonium salts of the same α-olefin/unsaturated acid copolymers include lower volatility, superior dried ink films, higher total solids content, less corrosion difficulty with the printing ink equipment, greater stability due to lower reactivity with the pigments of the ink formulation, and the like. By superior ink film is meant those which are harder, glossier, and more block resistant than those previously known. The lower volatility results in less loss of neutralizing agents during the neutralization and dispersion preparation, less loss of neutralizing agent in storage and the slower formation of water-insoluble ink films on the printing equipment has facilitating clean-up.

Although not necessary or critical for the practice of this invention, these novel ink compositions can be diluted if desired with up to 50 percent by weight of an organic diluent as for example, aliphatic alcohols such as methanol, ethanol, isopropanol, propanol and the like; ketones such as acetone, methyl ethyl ketone and the like; and glycol ethers such as Cellosolve solvent and the like.

It will be understood by those skilled in the art that the printing ink compositions of this invention can also contain additional optional components. For example, thickeners can be added to these compositions to increase the viscosity or stiffness of the ink. For this purpose, low molecular weight water-soluble polymers can be used, such as, the Carbowax polymers, a trademark for polyethylene glycol ethers. Other optional components include flow aids, antioxidants, light stabilizers, bacteriostatic agents, anti-foam agents or surfactants, and the like.

Pigments used in the art for the formulation of inks can be used in the practice of this invention as for example: barium lithol, phthalocyanine blue, phthalocyanine green, benzidene yellow, chrome yellow, Victoria blue, carbon black, titanium dioxide and the like.

The ink and aqueous overprint varnishes described herein can be employed to provide printed articles from a wide selection of diverse substrates, as for example, cellulosic substrates such as paper, wood and the like, metals both ferrous and non-ferrous; synthetic polymers such as α-olefin polymers, styrene polymers, acrylonitrile polymers, polycarbonates, polyurethanes, polyacetals synthetic rubbers, phenol-aldehyde condensation polymers, epoxy resins and the like.

Conventional equipment known in the art can be used for the preparation of the aliphatic α-olefin/unsaturated acid copolymer salts, aqueous overprint varnishes and the complete ink compositions. Atmospheric pressure is preferred for reasons of economy although subatomspheric and superatmospheric pressures can be used if desired. Temperature is not critical although a range of 30 to about 100° C. is convenient for these preparations.

The invention is further described in the examples which follow. All percentages are by weight unless otherwise specified.

Example 1.—Preparation of aqueous ethylene-acrylic acid copolymer N,N-diethyl ethanolamine salt dispersion Into a 4-necked, round-bottom reaction flask fitted with a condenser, thermometer, dropping funnel, and agitator was charged 50.0 g. (0.13 mole) of an ethylene-acrylic acid copolymer containing 19.8 percent acrylic acid copolymerized therein and having a melt index of 34 dg./min., 8.05 g. (0.068 moles) of N,N-diethyl ethanolamine, and 141.95 g. of water. The mixture charged was heated to a temperature of about 95 to 100° C. with agitation for about 1 hour. There was thus obtained an aqueous dispersion of ethylene-acrylic acid copolymer, 50 percent neutralized with N,N-diethyl ethanolamine, having a solids content of 25 percent, a pH of 8.6, a Brookfield viscosity (No. 4 spindle at 100 r.p.m.) of 1500 cps., translucent in in appearance with a small amount of scrap.

Example 2.—Preparation of aqueous ethylene-acrylic acid copolymer N,N-dimethyl ethanolamine salt dispersion Using the apparatus and procedure described in Example 1 a charge consisting of 50.0 g. (0.13 mole) of ethylene-acrylic acid copolymer having 19 percent acrylic acid copolymerized therein and a melt index of 242 dg./min., 5.88 g. (0.066 mole) of N,N-dimethyl ethanolamine, and 110.79 g. of water was agitated for about 1 hour at 95° to 100° C. The resultant aqueous dispersion of ethylene-acrylic acid copolymer, 50 percent neutralized with N,N-dimethyl ethanolamine, had a solids content of 30 percent, a pH of 8.4, a Brookfield viscosity (No. 5 spindle at 100 r.p.m.) of 2100 cps., and was translucent in appearance with little scrap.

Example 3.—Preparation of aqueous ethylene-acrylic acid copolymer N,N-dimethyl ethanolamine salt dispersion Example 2 was repeated with the exception that 11.77 g. (0.132 moles) of N,N-dimethyl ethanolamine and 138.23 g. of water was used. A translucent aqueous ethyleneacrylic acid copolymer salt, 100 percent neutralized with N,N-dimethyl ethanolamine, was obtained with a solids content of 25 percent, a pH of 9.2, a Brookfield viscosity (No. 5 spindle at 100 r.p.m.) of 5300 cps. completely free of scrap.

Example 4.—Preparation of aqueous ethylene-acrylic acid copolymer ethanolamine salt dispersion The procedure described in Example 2 was repeated with the exception that 4.03 g. (0.066 mole) of ethanolamine and 112.7 g. of water was used. The resultant translucent aqueous dispersion of ethylene-acrylic acid salt, 50 percent neutralized with ethanolamine, was obtained at a solids content of 30 percent, a pH of 8.3, a Brookfield viscosity (No. 7 spindle at 100 r.p.m.) of 14,700 cps. with a small amount of scrap.

Control A.—Preparation of an aqueous dispersion of ethylene-acrylic acid copolymer ammonium salt dispersion Using the procedure described in Example 1 a charge consisting of 75.0 g. (0.198 mol) of an ethylene-acrylic acid copolymer containing 19 percent acrylic acid copolymerized therein and having a melt index of 242 dg./min., 5.69 g. (0.099 mole) of aqueous ammonia (29.7 percent $NH_3$) and 169.31 g. of water was heated with agitation at a temperature of about 95° to 100° C. for about 1 hour. The ammonia solution was added via a dropping funnel after preheating the resin and water. The resultant water dispersion of ethylene-acrylic acid copolymer salt, 50 percent neutralized with ammonia, was obtained with a milky appearance, a solids content of 26 percent, a pH of 8.5, a Brookfield viscosity (No. 3 spindle at 100 r.p.m.) of 540 cps. with about 10 g. of scrap.

Control B.—Preparation of an ethylene-acrylic acid copolymer diethyl amine salt dispersion Using the procedure described in Example 1, a charge consisting of 100.0 g. (0.264 mole) of an ethylene-acrylic acid copolymer containing 19.0 percent acrylic acid copolymerized therein and having a melt index of 242 dg./min., 9.6 g. (0.131 mole) of diethylamine and 190.4 g. of water was heated with agitation at a temperature of about 95 to 100° C. for about 2 hours. The resultant dispersion of ethylene-acrylic acid copolymer salt, 50 percent neutralized with diethylamine was milky. Using 16.7 g. of water, 150.0 g. of the dispersion was diluted to a solids content of 30.0 percent. This dispersion had a pH of 8.35 and a Brookfield viscosity (No. 3 spindle at 100 r.p.m.) of 740 cps.

Example 5.—Preparation of an ethylene-methacrylic acid copolymer N,N-dimethyl ethanolamine salt dispersion Using the procedure described in Example 1 a charge consisting of 50.0 g. (0.07 mole) of an ethylene-methacrylic acid copolymer containing 12 percent methacrylic acid copolymerized therein, 7.0 g. (0.078 mole) of N,N-dimethyl ethanolamine, and 193.0 g. of water was heated with agitation at a temperature of about 95 to 100° C. for about 1 hour. The resultant aqueous dispersion of ethylene-methacrylic acid copolymer salt, 110 percent neutralized with N,N-dimethyl ethanolamine (10% excess over the theoretical amount required for complete neutralization), was milky in appearance, had a solids content of 20 percent, a pH of 9.9, a Brookfield viscosity (No. 3 spindle at 100 r.p.m.) of 400 cps. with a moderate amount of scrap.

Example 6.—Preparation of an ethylene-acrylic acid copolymer triethanolamine salt dispersion Using the procedure described in Example 1, a charge consisting of 50.0 g. (0.138 mole) of an ethylene-acrylic acid copolymer containing 19.8 percent acrylic acid copolymerized therein and having a melt index of 34 dg./min., 20.5 g. (0.1375 mole) of triethanolamine and 179.5 g. of water was heated with agitation at a temperature of about 95° C. to 100° C. for about 1 hour. The resultant translucent solution of ethylene/acrylic acid copolymer salt, 100 percent neutralized with triethanolamine, was obtained with a solids content of 20 percent, a pH of 8.7, a Brookfield viscosity (No. 2 spindle at 100 r.p.m.) of 360 cps. with little scrap.

Example 7.—Ink preparation

A charge consisting of 50.0 g. of the dispersion obtained in Example 2, 12.0 g. of barium lithol and 38.0 g. of water was charged directly to a ball mill (a glass jar filled ⅓ full of ceramic balls) which was then rolled on electrically driven rollers for 16 to 24 hours. The resultant ink formulation showed an excellent dispersion of pigment, no pigment settling, a solids content of 27.0 percent and a viscosity (No. 3 Zahn cup) of 12.6 seconds.

The ink viscosities for intaglio and flexographic printing are usually measured by the Ford cup or Zahn cup methods in which the viscosity of the ink is measured by the time in seconds required for a metered amount of ink to pass through a predetermined orifice under the influence of gravity. When diluted for use on a printing press a characteristic range of viscosities for gravure or flexographic inks as measured by a No. 2 Zahn cup would be from 20 seconds to 40 seconds or in a No. 3 Zahn cup from 10 seconds to 30 seconds, roughly equivalent to 1 to 2 poises.

Pigment dispersion quality is determined with the NPIRI Grindometer which is a metal plate containing machined channels ranging in depth from 0 to 1.0 mil. The ink to be tested is placed in the deep end of the channel and pulled to the shallow end with a draw knife. Well dispersed inks cause scratches in the ink film only near the shallow end of the channels.

The copolymer dispersion used in the preparation of this ink formulation had a particle size range of 0.02 to 0.04 microns when observed under an electron microscope.

Films of the dispersion used in this example showed no yellowing at 50° C. for 24 hours, a slight yellowing at 100° C. for 24 hours, excellent water resistance for air dried films and films dried for 1 minute at 110° C., a block resistance rating of 1 at 55° C., 1 at 65° C., and 3 at 75° C. The films of the dried ink also had excellent water-resistance and had a gloss rating of 89 to 75° and a glossy brilliant color. Block resistance was determined by leaving two films in face to face contact at 3 p.s.i. for 24 hours. 0 denotes no sticking, 1 denotes slight sticking, 2 denotes surface marred when films were pulled apart and 3 denotes film sealed to one another.

Water resistance was determined by putting a spot of distilled water on the dried film, allowing the water to soak for 30 seconds, and then rubbing with a paper towel. The amount of film removed is judged visually and indicates water resistance.

Film rewettability, designed to predict the feasibility of restarting a printing press without cleaning the plates with solvent after the press has been stopped for a short period of time, was determined by casting a thin film of ink on a metal plate and allowing it to air dry for 20 minutes. Then another film of ink was cast over the dried film and covered with a second panel to prevent evaporation. After five minutes the plates were separated, washed with water and the amount of ink remaining was rated visually. Ideally the ink should be almost completely removed. The ink formulations of this invention all showed excellent rewettability.

The cellophane tape adhesion test determines the adhesion of an ink film using a strip of cellophane adhesive tape about 6 inches long. The tape is smoothed down firmly over a representative printed area and then pulled off at a little less than a 180° angle. The tape is pulled off slowly for about half way and then jerked quickly to remove it completely. The two parts of the test area are rated separately by visual determination of the amount of ink removed.

The crinkle test is a function of both the adhesion and flexibility of a dried ink film. A printed area of the film is grasped between the thumb and forefinger of each hand with about ½ inch of film between the thumbs. The thumbs are then put closely together and rotated fairly rapidly about 10 times with motions similar to peddling a tiny bicycle. The results of the test are rated by a visual examination of the amount of ink film cracking and flaking.

Example 8.—Ink preparation

The procedure described in Example 7 for the preparation of an ink was followed using a charge consisting of 60.0 g. of the polymer salt dispersion in Example 4, 12.0 g. of phthalocyanine blue, and 28.0 grams of water. The resultant ink showed excellent dispersion, no pigment settling, a solids content of 27.0 percent and a viscosity in a No. 3 Zahn cup of 10.6 seconds.

Example 9.—Ink preparation

The procedure described in Example 7 was repeated using a charge consisting of 50.0 g. of the dispersion obtained in Example 2, 40.0 g. of titanium dioxide, and 10.0 g. of water. An additional 5.0 g. of water was then added to reduce the viscosity. The resultant ink obtained in a solids content of 52.4 percent showed excellent pigment dispersion, no pigment settling and exhibited a No. 3 Zahn cup viscosity of 16.0 seconds.

Example 10.—Ink preparation

The procedure described in Example 7 was employed with a charge consisting of 75.0 g. of the dispersion obtained in Example 5, 12.0 g. of barium lithol and 13.0 g. of water. The resultant ink was diluted with 5.0 grams of water and 10.0 g. of ethanol. This ink formulation showed good dispersion of pigment, had a final solids content of 23.5 percent, a viscosity No. 3 Zahn cup of 13.0 seconds and no pigment settling.

Examples 11–16

When Example 7 was repeated with the exception that the pigment was phthalocyanine blue, benzidene yellow, chrome yellow, Victoria blue, carbon black or phthalocyanine green, ink formulations of comparable quality were obtained.

The adhesion properties of the ink formulation prepared in Example 7 to cast coated paper, glassine paper, poly(vinylidene chloride) coated cellophane, uncoated cellophane, and corona discharge treated polyethylene substrates were "excellent" in the slow pull cellophane tape test. As stated before "excellent" indicates no ink removed in the test area. A rating of "good" indicates less than 15 percent of the ink removed in the test area, "fair" less than 30 percent of ink removed in test area and "poor" more than 30 percent of the ink removed in the test area. The ratings were excellent for jerk-pulled cellophane tape test with cast coated paper and uncoated cellophane and "good" for the other three substrates. In the crinkle test glassine paper and corona discharge polyethylene were "excellent," poly(vinylidene chloride) coated cellophane "good," and uncoated cellophane "good." With films dried for 10 seconds at 90° C. all substrates were "excellent" in the slow pull cellophane tape test and with the jerk test "excellent" for cast coated paper, poly(vinylidene chloride) coated cellophane and uncoated cellophane.

Examples 17–21.—Ink preparation

The procedure described in Example 7 was repeated with the exception that the polymer salts used were prepared as described in Example 2 replacing the N,N-dimethyl ethanolamine with diethanolamine, triethanolamine, N-methyl ethanolamine, N,N-diethyl ethanolamine, and N,N-diisopropyl ethanolamine. Comparable ink formulations were obtained.

Example 22.—Ink preparation

The procedure described in Example 7 for the preparation of an ink was followed using a charge consisting of 37.5 g. of the polymer salt dispersion obtained in Example 6, 12.0 g. of carbon black, and 50.5 g. of water. The resultant ink had a pH of 8.9, showed excellent dispersion, no pigment settling, and a solids content of 19.5 percent. The viscosity as determined on a Hercules High-Shear Viscometer was 32 cps. at 1100 r.p.m. and 26 cps. at 2200 r.p.m. using an A bob and a 100,000 dyne/cm. spring.

The viscosity necessary for printing an aqueous news ink is about 30 cps. The pigment must be well dispersed to obtain the maximum opacity and ink mileage. A pH above 7 is desired to minimize press corrosion.

Unlike a conventional mineral oil based news ink, the films of this ink did not produce strike through or show through and the dried films had much less tendency to smudge. Water resistance of the films was also good. The ink was easily cleaned up with an alkaline water solution.

Example 23

An overprint lacquer was formulated from the dispersion prepared in Example 2 using 50.0 g. of the dispersion, 45.0 g. of ethanol, and 5.0 g. of a wax dispersion containing 20 percent of a modified microcrystalline petroleum wax in ethanol-shellac solution. After mixing, this lacquer was used to overcoat prints of the ink prepared in Example 7 on 15 point uncoated food board stock. A wire wound rod was used to prepare both the ink film and the overprint film. The top coat was dried in a hot air oven for 10 seconds at 110° C.

The resulting overprinted films had excellent mar and abrasion resistance. Samples of the films withstood 1200 cycles using a 4 pound weight on a Sutherland Rub Tester with only slight color transfer. Wet rub resistance was also excellent as indicated by the Sutherland wet rub test. The samples passed 50 rubs using a 4 pound weight without film failure and only slight color transfer. Gloss of the films was good going from 21 for the non-overprinted film to 45 for the overprinted film, as measured on a Photovolt 75° gloss meter. Samples of the overprinted films were tested for blocking at 50° C. and ambient humidity for 24 hours. No set off occurred and only slight sticking was encountered when the samples were tested film to film. No blocking or set off occurred when tested film to substrate.

Example 24.—Print trial (A) To a 35 gallon steel reactor filled with paddle type stirrer and capable of pressures up to 25 p.s.i., were charged 72.0 pounds of an ethylene/acrylic acid copolymer containing 19.0 percent acrylic acid copolymerized therein, and having a melt index of 242 dg./min., 6.76 pounds of N,N-dimethyl ethanolamine, and 161.0 pounds of water. The mixture charged was heated to a temperature of about 100° C. with agitation for about 1 hour. The mixture was discharged through a fiber glass sock and 222.5 pounds were recovered. Filtering of a sample through a 100 mesh screen gave 0.04 percent insolubles. The mixture was 40 percent neutralized with a N,N-dimethyl ethanolamine and had a solids content of 30 percent, a pH of 8.2, and a Brookfield viscosity (No. 4 spindle at 60 r.p.m.) of 3800 cps. and was translucent in appearance.

(B) Three inks were prepared from the dispersion obtained in part (A). The formulations were as below:

|  | 1 | 2 | 3 |
|---|---|---|---|
| Molybdate Orange, pounds | 46.0 | | |
| Barium Lithol, pounds | | 13.5 | |
| Phthalocyanine Blue, pounds | | | 13.0 |
| Dispersion from A, pounds | 51.0 | 54.0 | 50.0 |
| Ethanol, pounds | 7.5 | 6.5 | 6.0 |
| Wax compound, pounds | 5.5 | 4.5 | 4.5 |

The above materials except for the wax compound were charged directly to a 20 gallon Attritor Mill (a steel kettle filled with glass beads having a high speed stirrer consisting of metal bars fastened to center shaft. Each ink was ground until it gave a reading of less than 1 on a NPIRI grindometer. Grinding times were 25 minutes for the orange, 75 minutes for the red, and 60 minutes for the blue. After the pigment was dispersed, the wax compound (a 20 percent dispersion of a modified microcrystalline petroleum wax in a shellac-ethanol media) was added and the inks were ground for 5 minutes more to disperse the wax.

(C) The inks were printed on a Lilliput flexographic press having circulating ink fountains and an oven type hot air dryer. The orange ink was the first down color and it was overprinted with the blue and red inks. The inks transferred well onto both paper and corona discharge treated, pigmented polyethylene film. No bleeding was encountered in the overprinted areas. Over a five hour press run the viscosities of the inks remained stable requiring only replacement of evaporated solvent. No foaming was encountered. The resulting prints were excellent having sharp fine print and good coverage in the solid print regions. The inks dried rapidly on both paper and film. On paper, press speeds of 400 ft./min. were attained with an oven temperature of 230° F. On film, press speeds of 250 ft./min. were attained with oven temperatures of 210° F. The prints on brown and bleached kraft and fair gloss and those on film had good gloss.

Example 25.—Preparation of an ethylene-acrylic acid copolymer N,N-dimethylethanloamine salt dispersion in water/ethylene glycol A round bottom, single necked flask was charged with 100 grams of an aqueous ethylene-acrylic acid copolymer N,N-dimethylethanolamine salt dispersion prepared as in Example 1 and 90.0 grams of ethylene glycol. The flask was then fitted to a Rotary Vacuum Evaporator purchased from Rinco Instrument Company. The flask was rotated in a water bath maintained at a temperature of about 30 to 50° C. while water was stripped off by means of a vacuum system. The water stripping operation was continued until about 62.1 grams of liquid (principally water) was removed from the resultant mix in the round bottom flask. The nominal composition of product in the round bottom flask was 23.5% by weight of ethylene/acrylic acid copolymer neutralized with 2.2 weight percent of N,N-dimethylethanolamine, 70.2 weight percent of ethylene glycol and 4 percent by weight of water. This dispersion was translucent and homogeneous with a Brookfield viscosity, RVF model of 11,250 cps. at 20 r.p.m. with a number 6 spindle. The dispersion thus prepared was tested as a binder vehicle for a low viscosity flexographic type ink in the following manner. 50 grams of the above prepared dispersion was stirred with 33.0 grams of ethylene glycol and 12.0 grams of Graphic Red M OP–2131 purchased from the Sherwin Williams Paint Company in an 8 ounce glass jar until homogeneous. About one half of the jar volume was filled with carborundum balls having a diameter of about ½ inch, the jar was sealed and rolled on a ball mill roll to disperse pigment. After dilution with water and ethanol and further milling over night the resultant ink was applied to brown kraft paper, glassine paper, and coated tag board using an Anilox Flexo Handproofer. The resultant prints had bright, clean color. After the prints were air dried for two minutes good dry rub had developed as well as wet rub. The ease of wash-up of this ink was good and about equivalent to that with the ink prepared in Example 7.

Example 26.—Preparation of an ethylene-acrylic acid copolymer N,N-dimethylethanolamine salt dispersion in water/ethylene glycol Using the procedure described in Example 25, 160 parts of an ethylene/acrylic acid copolymer having about 19% acrylic acid copolymerized therein and a melt index of about 242 dg./min., 40% neutralized with N,N-dimethylethanolamine was blended into a 30% resin solid dispersion in a 50:50 water/ethylene glycol mixture together with 40 parts of Barium Lithol Red Toner RT-2318 obtained from the Hollard-Suco Color Company. This dispersion was prepared on an Intermittant type Attritor type B Size 01 manufactured by Union Process, Inc. The resultant grind was then further diluted with an additional 20 grams of ethylene glycol in a grinding time of about 20 minutes. This ink composition was tested for printing properties by making prints with a handproofer. The handproofer consisted of a soft rubber roll (about 5 inches long and 3 inches in diameter) mounted on a handle. Several grams of the ink was placed on a 6″ x 12″ glass plate and the handproofer was rolled over the ink until a uniform film was obtained on the plate and roller. When a uniform film of ink was obtained a print was made by applying ink to brown kraft paper with the handproofer. This ink composition was observed to roll out easily without excessive tack or "stringing." The films on the roller and the plate were smooth. When applied to paper the ink had a bright, clean color and dried to "print free" (no color transferred to finger when touched) film in about one minute. A second sheet of paper could be laid atop a print immediately after application of ink without encountering "Setoff" (transfer of ink to the backside of the top sheet).

Example 27.—Preparation of an ethylene-acrylic acid copolymer N,N-ethanolamine salt dispersion in diethylene glycol/water Following the procedure described in Example 25 an ethylene-acrylic acid copolymer salt dispersion was obtained having a resin content of about 20 weight percent, a dimethylethanolamine content of about 1.9 weight percent, a diethylene glycol content of about 58.6 weight percent, and a water content of about 19.5 weight percent. The viscosity of this dispersion was about 170 centipoises. When this dispersion was evaluated as an ink binder as described in Example 25 satisfactory results were obtained.

Examples 28–32.—Preparation of ethylene-acrylic acid copolymer salts of N,N-dimethylethanolamine dispersions in various alkylene glycols When Example 25 was repeated with the exception that the ethylene glycol was replaced by triethylene glycol, tetraethylene glycol, propylene glycol, dipropylene glycol, or 1,5-pentene glycol, comparable results were obtained both as to the nature of the dispersion and the resultant ink formulations.

Example 33.—Preparation of ethylene-acrylic acid copolymer salt of N,N-dimethylethanolamine dispersion in ethylene glycol Example 25 was repeated with the exception that all of the water was stripped from the mixture affording a resin dispersion containing about 30 weight percent ethylene-acrylic acid copolymer, about 2.8 weight percent of dimethylethanolamine and about 67 weight percent of ethylene glycol. The resultant dispersion had a viscosity of 1,350 centipoises and proved to be a satisfactory binder in ink formulations.

Although the invention has been described in its preferred forms with a certain degree of particularity, it is understood that the present disclosure has been made only by way of example, and that numerous changes can be made without departing from the spirit and scope of the invention.

What is claimed is:
1. Printing ink composition consisting essentially of:
(a) about 5 to 30 percent by weight of a film forming salt of an aliphatic α-olefin/α,β-ethylenically unsaturated monocarboxylic acid copolymer containing at least 80 mole percent of an aliphatic α-olefin having up to 10 carbon atoms and 4 to 20 mole percent of an α,β-ethylenically unsaturated monocarboxylic acid copolymerized therein, said copolymer being about 30 to 100 percent neutralized with an alkanolamine having the formula $(R)_y N(R'OH)_x$ where $x=3-y$ and $x$ is an integer having values of 1 to 3, R is H or an alkyl having 1 to 10 carbon atoms, and R' is an alkylene radical having two to ten carbon atoms;
(b) about 5 to 20 percent by weight of pigment; and
(c) about 90 to 20 percent by weight of at least one diluent selected from the class consisting of water and an alkylene glycol having the formula:

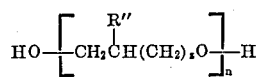

wherein R″ is a monovalent radical selected from the group consisting of H or lower alkyl, $z$ is an integer having values of 0 to about 3 and $n$ is an integer having values of 1 to about 4.
2. Composition claimed in claim 1 wherein the aliphatic α-olefin is ethylene.
3. Composition claimed in claim 2 wherein the ethylene polymer contains about 6 to 14 mole percent α,β-ethylenically unsaturated carboxylic acid.
4. Composition claimed in claim 2 wherein the ethylene polymer contains about 7.5 to 10.5 mole percent α,β-ethylenically unsaturated carboxylic acid.
5. Composition claimed in claim 1 wherein the alkanolamine is an N,N-dialkyl alkanolamine.
6. Composition claimed in claim 5 wherein the N,N-dialkyl alkanolamine is N,N-dimethyl ethanolamine.
7. Composition claimed in claim 2 wherein the α,β-ethylenically unsaturated carboxylic acid is acrylic acid.
8. Composition claimed in claim 1 wherein the pigment is barium lithol.
9. Composition claimed in claim 1 wherein the pigment is phthalocyanine blue.
10. Composition claimed in claim 1 wherein the pigment is titanium dioxide.
11. Composition claimed in claim 1 wherein the pigment is benzidene yellow.
12. Composition claimed in claim 1 wherein the pigment is chrome yellow.
13. Composition claimed in claim 1 wherein the pigment is Victoria blue.
14. Composition claimed in claim 1 wherein the pigment is carbon black.
15. Composition claimed in claim 1 having up to 50 percent of an aliphatic monohydric alcohol having 1 to 6 carbon atoms admixed therein.
16. Composition claimed in claim 15 wherein the aliphatic monohydric alcohol is ethanol.
17. Composition claimed in claim 1 wherein the alkylene glycol is ethylene glycol.
18. Composition claimed in claim 1 wherein the alkylalkylene glycol is diethylene glycol.

19. Composition claimed in claim 1 wherein the alkylene glycol is triethylene glycol.

20. Composition claimed in claim 1 wherein the alkylene glycol is propylene glycol.

21. Composition claimed in claim 1 wherein the alkylene glycol is dipropylene glycol.

22. Composition claimed in claim 1 wherein the alkylene glycol is 1,5-pentene glycol.

23. Printing ink composition consisting essentially of:
(a) about 5 to about 30 percent by weight of a film forming salt of an aliphatic α-olefin/acrylic acid copolymer containing at least 80 mole percent of an aliphatic α-olefin having up to 10 carbon atoms and 4 to 20 mole percent of acrylic acid copolymerized therein, said copolymer being about 30 to 100 percent neutralized with an alkanolamine having the formula $(R)_yN(R'OH)_x$ where $x=3-y$ and $x$ is an integer having values of 1 to 3, R is H or an alkyl having 1 to 10 carbon atoms, and R' is an alkylene radical having 2 to 10 carbon atoms;
(b) about 5 to 20 percent by weight of pigment and
(c) about 90 to about 20 percent by weight of an alkylene glycol having the formula:

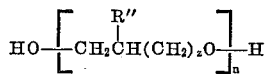

wherein R" is a monovalent radical selected from the group consisting of H or lower alkyl, z is an integer having values of about 0 to 3 and n is an integer having values of about 1 to about 4.

References Cited
UNITED STATES PATENTS

| | | | |
|---|---|---|---|
| 3,249,570 | 5/1966 | Potts et al. | 260—29.6 TA |
| 3,389,109 | 6/1968 | Harmon et al. | 260—29.6 TA |

HAROLD D. ANDERSON, Primary Examiner

U.S. Cl. X.R.

117—12, 15; 260—29.6 H, 29.6 TA, 33.4 R